Figure 4:
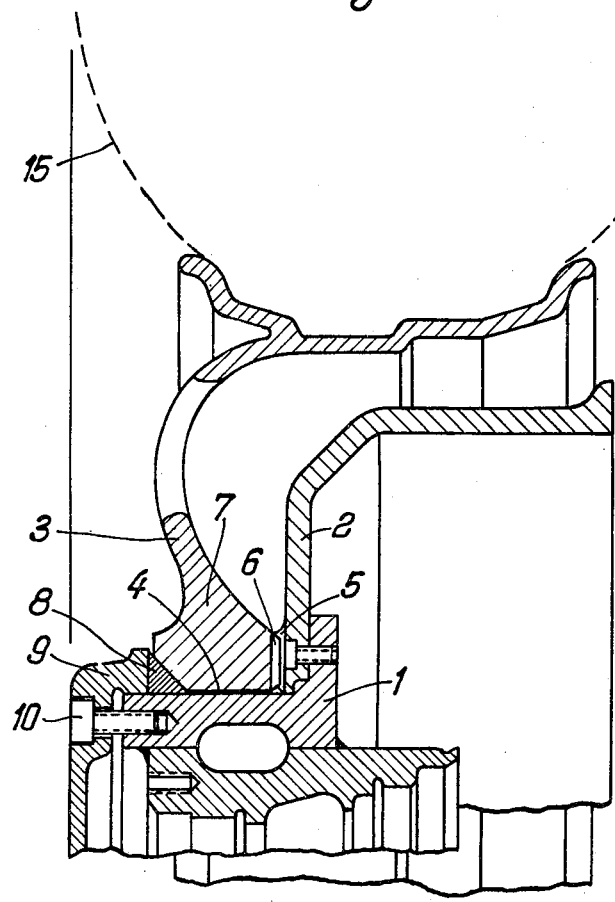

Nov. 21, 1961  K. RABE ET AL  3,009,742
WHEEL ASSEMBLIES
Filed Sept. 8, 1958  4 Sheets-Sheet 1
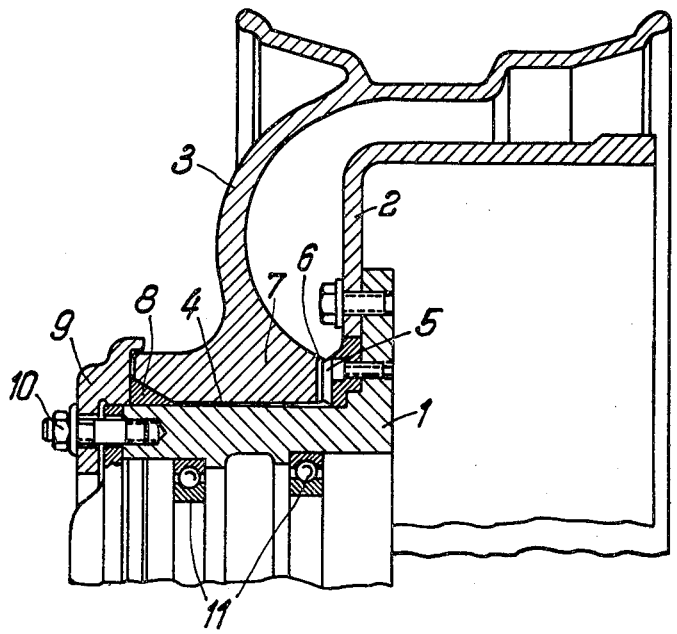
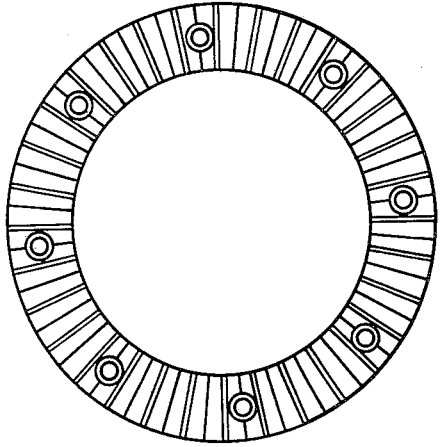 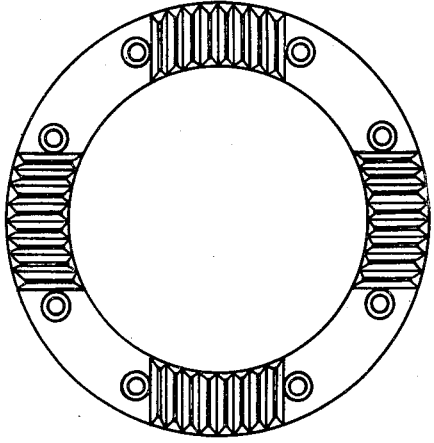
INVENTORS:
KARL RABE, KURT SUTOR, WERNER KRAPP

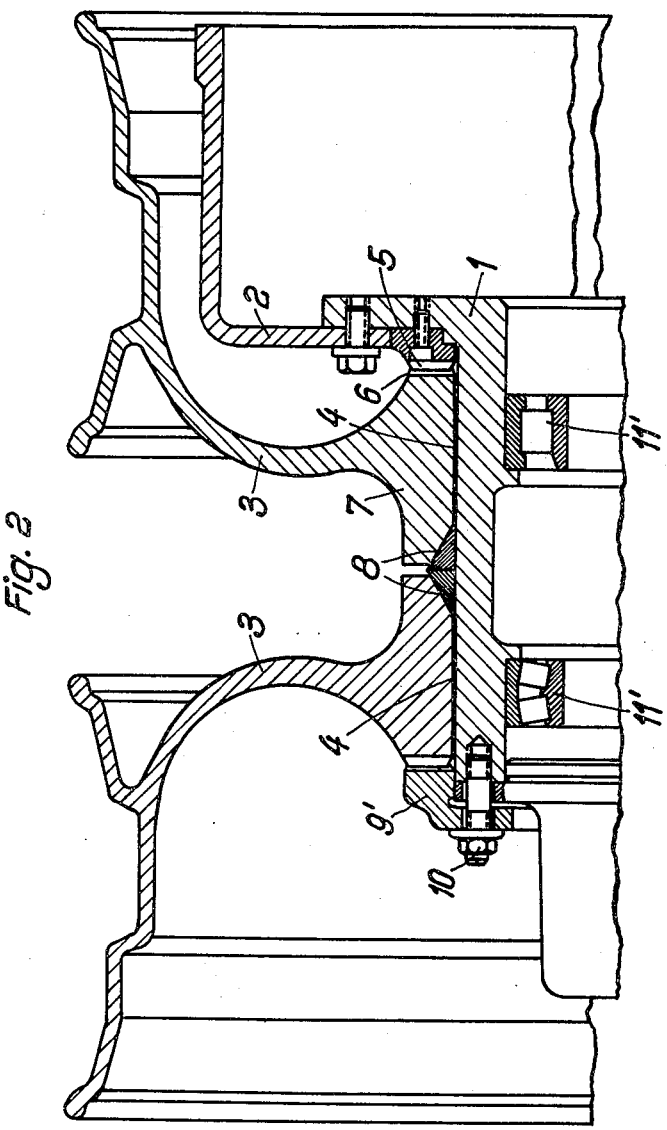

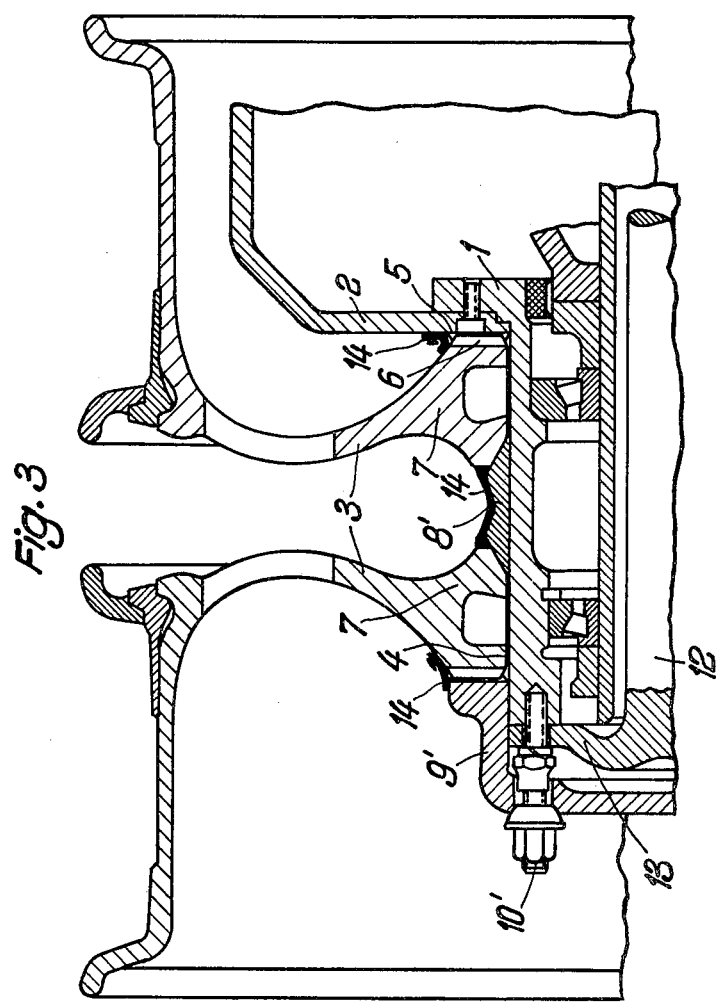

Nov. 21, 1961

K. RABE ET AL 3,009,742

WHEEL ASSEMBLIES

Filed Sept. 8, 1958

4 Sheets-Sheet 4

INVENTORS
KARL RABE, KURT SUTOR,
WERNER KRAPP
BY

Mestern & Kollin
ATTORNEYS

United States Patent Office 3,009,742
Patented Nov. 21, 1961

3,009,742
WHEEL ASSEMBLIES
Karl Rabe, Stuttgart-Korntal, Kurt Sutor, Solingen-Ohligs, and Werner Krapp, Solingen-Merscheid, Germany, assignors to Kronprinz Aktiengesellschaft, Solingen-Ohligs, Germany
Filed Sept. 8, 1958, Ser. No. 759,779
2 Claims. (Cl. 301—9)

This invention relates to wheel assemblies of the type used for motorcars. The object of the invention is to provide an assembly which permits the wheel to be mounted truly concentrically on its hub, and in such a way that a force applied to the one element is transmitted to the other element without the joint or joints beween them being deformed.

The invention consists in a wheel assembly including a wheel, a hub, a brake drum fastened to the hub, removable means for preventing axial movement between the wheel and the hub, and means for centering the wheel on the hub, wherein the centering means consist of two mating tooth systems the tips of the teeth of which are contained in respective parallel planes at right angles to the axis of the hub, and wherein one tooth system is fastened to, or forms part of, the brake drum, while the other tooth system is fastened to, or forms part of, the wheel.

The invention also consists in a wheel assembly including a wheel, a hub, a brake drum, removable means for preventing axial movement between the wheel and the hub, and means for centering the wheel on the hub, wherein the centering means consist of two mating tooth systems the tips of the teeth of which are contained in respective parallel planes at right angles to the axis of the hub, wherein one tooth system arranged on the hub is located within a centre aperture of the flange of the brake drum, wherein the other tooth system is fastened to, or forms part of, the wheel, and wherein the brake drum is removably mounted to a flange of the hub by means of a flange arranged concentrically in front of the hub and adapted to be pressed against the brake-drum flange by the removable means for preventing axial movement.

Each of the tooth systems may be a Hirth tooth system or a system consisting of a plurality of tooth groups arranged in a circle, the teeth of each group being parallel to one another. Whatever tooth system is used, it is advantageous if the diameter of the system is sufficiently small to permit the system on the wheel to be arranged within its reinforced centre portion. On the other side of the wheel, i.e. the side remote from the tooth system in the brake drum, the wheel may be locked to the hub with the aid of an externally tapered locking collar. Alternatively, an additional tooth system may be provided on this side of its reinforced centre section, and this system may mate with a further tooth system fastened to, or forming part of, a thrust collar, which may be mounted concentrically on the hub with the aid of the removable means for preventing axial displacement of the wheel on the hub. It is advantageous if the diameter of a centre aperture extending through the centre portion of the wheel is sufficiently large to allow clearance between the edge of the aperture and the portion of the hub extending in axial direction.

A wheel assembly according to the invention may be used with advantage for a so-called twin-wheel arrangement of the kind used for delivery vans and trucks. This assembly may include two wheels in mirror arrangement. Each of the two wheels may be provided with a tooth system. Whereas the tooth system of the wheel adjacent to the brake drum may mate, as in the single-wheel assembly, with the tooth system located on or within an aperture of the brake drum, it is advantageous if the tooth system of the outer wheel mates with the tooth system fastened to or forming part of the thrust collar. Instead of using a separate locking collar for each of the two wheels, the two wheels may be locked by a single collar. If a single collar only is arranged between the two wheels, it is advantageous if the collar is tapered externally in two opposite directions.

Some embodiments of the invention will now be described in more detail with reference to the accompanying diagrammatic drawings, in which FIGURE 1 is an axial section of a wheel assembly according to the invention including a single wheel, FIGURE 2 is an axial section of an assembly including two wheels in mirror arrangement, FIGURE 3 is an axial section of an assembly similar to the one illustrated in FIGURE 2 but including a shaft for driving the wheels, FIGURE 4 is an axial section of a single wheel in an assembly of the kind generally used for mounting two wheels in mirror arrangement as illustrated in FIGURE 3, FIGURE 5 is a plan view of a Hirth tooth system, and FIGURE 6 is a plan view of a tooth system including a plurality of tooth groups having teeth extending parallel to one another.

Like elements are denoted by like reference numerals in all figures.

Referring to FIGURE 1, a brake drum 2 is arranged as usual on a hub 1. A wheel including its rim is denoted by the reference numeral 3. The wheel 3 is mounted on the hub 1 in such a way as to provide clearance—denoted by the reference numeral 4—between a centre aperture of the wheel and the hub. One tooth system 5 is arranged on the brake drum 2 or on a component fastened thereto. The tooth system may be either an actually known Hirth tooth system as illustrated in FIGURE 5, or it may be a tooth system of the type illustrated in FIGURE 6 consisting of four tooth groups arranged in a circle, wherein the teeth of each group are parallel to one another. A system of this type also is known per se. A mating tooth system 6 of the tooth system 5 arranged on the brake drum is provided on a reinforced centre portion 7 of the wheel 3. The tips of the teeth of the two systems 5 and 6 are contained in respective parallel planes at right angles to the axis of the hub. The end of centre portion 7 opposite the end on which the tooth system 6 is arranged is locked by an externally tapered locking collar 8 which is slotted. The locking collar is arranged in a recess of the centre portion 7. This recess is tapered to suit the taper of the locking collar. The locking collar is driven into the tapered recess of the centre portion 7 by a plain thrust collar 9 as a result of screwing bolts 10 into the hub 1. The hub 1 is mounted on ball bearings 11 in such a way as to permit it to rotate freely about a tubular axle which is not illustrated.

Referring to FIGURE 2, it will be noted that the assembly including an inner wheel and an outer wheel in mirror arrangement is provided with two externally tapered locking collars 8. A thrust collar 9' is provided with a tooth system to suit the mirror arrangement. Bearings 11' are roller bearings.

The principle of the wheel assembly including twin wheels illustrated in FIGURE 3 is the same as the principle of the assembly illustrated in FIGURE 2. It differs from the arrangement illustrated in FIGURE 2 in as far as the hub 1 is not mounted to rotate freely but is driven by a shaft 12 through a flange 13. This flange is fastened to the hub 1 by means of bolts 10' which also force the thrust collar 9' against the wheel.

Contrary to the assembly illustrated in FIGURE 2 a single locking collar 8', which is tapered externally in two opposite directions, is mounted between the two wheels. The collar 8' is slotted across its width. The taper of this collar is such that a part of the force which is effective in axial direction is transmitted to the hub. The circumferential faces of the tooth systems and the locking collar are covered by means of elastic seals 14 to protect them against dirt and corrosion.

A further feature of this embodiment is that the centre portions 7 of the wheels 3 are reduced in size, so that, if used in a single wheel assembly as illustrated in FIGURE 4, the end of the hub and the thrust collar 9 will project little or not at all beyond a plane containing a side wall of a tire 15 indicated by broken lines.

What we claim is:

1. In a wheel assembly, in combination, a hub; a wheel surrounding said hub with all-around clearance therebetween; and co-operating means on said hub and said wheel for centering the latter upon said hub and positively interengaging said hub and said wheel, said means including at least one set of angularly spaced teeth formed on said hub and lying substantially in a plane transverse to the axis of said hub, said wheel having a plurality of angularly spaced teeth lying substantially in a plane transverse to the axis of said wheel and interleaved with the teeth of said hub, an annular wedge member, axially spaced from said teeth and conically converging toward the axis of said hub in the direction of said teeth, interposed between said wheel and said hub, and locking means axially urging said wedge member between said wheel and said hub and the teeth of said hub into interlocking engagement with the teeth of said wheel.

2. In a wheel assembly, in combination, a hub; a wheel surrounding said hub with all-around clearance therebetween; and co-operating means on said hub and said wheel for centering the latter upon said hub and positively interengaging said hub and said wheel, said means including at least two angularly spaced arrays of angularly spaced teeth formed on said hub and lying substantially in a plane transverse to the axis of said hub, said wheel having a plurality of angularly spaced teeth lying substantially in a plane transverse to the axis of said wheel and interleaved with the teeth of said hub, an annular wedge member, axially spaced from said teeth and conically converging toward the axis of said hub in the direction of said teeth, interposed between said wheel and said hub, and locking means axially urging said wedge member between said wheel and said hub and the teeth of said hub into interlocking engagement with the teeth of said wheel.

References Cited in the file of this patent

UNITED STATES PATENTS

| 714,533 | Tazewell | Nov. 25, 1902 |
| 1,099,770 | Simmons | June 9, 1914 |
| 2,516,896 | Manning | Aug. 1, 1950 |
| 2,906,558 | Forbush | Sept. 29, 1959 |

FOREIGN PATENTS

| 448,965 | France | Nov. 13, 1913 |
| 543,521 | France | Sept. 5, 1922 |
| 585,484 | Germany | Oct. 4, 1933 |